United States Patent
Varney

(10) Patent No.: US 10,260,362 B2
(45) Date of Patent: Apr. 16, 2019

(54) TURBINE VANE ASSEMBLY WITH CERAMIC MATRIX COMPOSITE AIRFOIL AND FRICTION FIT METALLIC ATTACHMENT FEATURES

(71) Applicant: Rolls-Royce Corporation, Indianapolis, IN (US)

(72) Inventor: Bruce E. Varney, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 135 days.

(21) Appl. No.: 15/607,744

(22) Filed: May 30, 2017

(65) Prior Publication Data
US 2018/0347383 A1 Dec. 6, 2018

(51) Int. Cl.
| | | |
|---|---|---|
| F01D 9/00 | (2006.01) | |
| F01D 5/00 | (2006.01) | |
| F01D 9/04 | (2006.01) | |
| F01D 5/28 | (2006.01) | |
| F01D 5/14 | (2006.01) | |
| C04B 37/02 | (2006.01) | |

(52) U.S. Cl.
CPC .............. *F01D 9/044* (2013.01); *C04B 37/02* (2013.01); *F01D 5/141* (2013.01); *F01D 5/147* (2013.01); *F01D 5/284* (2013.01); *F05D 2230/236* (2013.01); *F05D 2230/237* (2013.01)

(58) Field of Classification Search
CPC .......... F01D 9/044; F01D 9/042; F01D 5/141; F01D 5/147; F01D 5/284; F05D 2230/236; F05D 2230/237
See application file for complete search history.

(56) References Cited

U.S. PATENT DOCUMENTS

| | | | |
|---|---|---|---|
| 3,910,716 A | 10/1975 | Roughgarden et al. | |
| 5,248,240 A * | 9/1993 | Correia | F01D 9/042 |
| | | | 415/191 |
| 5,332,360 A | 7/1994 | Correia et al. | |
| 5,601,407 A | 2/1997 | Humhauser | |
| 5,797,725 A | 8/1998 | Rhodes | |
| 6,648,597 B1 | 11/2003 | Widrig et al. | |
| 8,215,900 B2 | 7/2012 | Morrison | |
| 8,231,354 B2 | 7/2012 | Campbell et al. | |
| 8,714,920 B2 * | 5/2014 | Campbell | B22D 19/00 |
| | | | 415/191 |
| 9,238,969 B2 | 1/2016 | Batt et al. | |
| 9,803,486 B2 | 10/2017 | Freeman et al. | |
| 9,951,639 B2 * | 4/2018 | Ivakitch | F01D 9/042 |
| 2005/0254942 A1 | 11/2005 | Morrison et al. | |
| 2008/0286109 A1 * | 11/2008 | Keith | F01D 5/147 |
| | | | 416/239 |
| 2010/0054915 A1 * | 3/2010 | Devore | F01D 5/189 |
| | | | 415/116 |
| 2010/0054930 A1 | 3/2010 | Morrison | |
| 2010/0068034 A1 | 3/2010 | Schiavo et al. | |
| 2010/0166565 A1 | 7/2010 | Uskert et al. | |
| 2011/0142639 A1 | 6/2011 | Campbell et al. | |
| 2012/0009071 A1 | 1/2012 | Tanahashi et al. | |

(Continued)

*Primary Examiner* — Thomas Moulis
(74) *Attorney, Agent, or Firm* — Barnes & Thornburg LLP

(57) ABSTRACT

A turbine vane for a gas turbine engine incorporating a ceramic matrix composite airfoil is disclosed in this paper. The turbine vane includes an attachment unit configured to mount the ceramic matrix composite airfoil to other metallic components of the turbine vane.

25 Claims, 2 Drawing Sheets

(56) References Cited

U.S. PATENT DOCUMENTS

| | | | |
|---|---|---|---|
| 2012/0099998 A1* | 4/2012 | Moor | B23K 20/1205 |
| | | | 416/213 R |
| 2012/0156044 A1 | 6/2012 | Ortiz | |
| 2014/0259665 A1* | 9/2014 | Bruck | F01D 5/005 |
| | | | 29/889.1 |
| 2016/0177749 A1 | 6/2016 | Brandl et al. | |
| 2016/0376899 A1* | 12/2016 | Prugarewicz | F01D 5/147 |
| | | | 415/115 |
| 2017/0067487 A1* | 3/2017 | Hartung | F01D 5/16 |

\* cited by examiner

TURBINE VANE ASSEMBLY WITH CERAMIC MATRIX COMPOSITE AIRFOIL AND FRICTION FIT METALLIC ATTACHMENT FEATURES

FIELD OF THE DISCLOSURE

The present disclosure relates generally to gas turbine engines, and more specifically to vanes used in gas turbine engines that include ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The integration of ceramic matrix composite materials into static vane assemblies is of interest because of the high-temperature capability of these materials. However, coupling ceramic matrix composite materials to other components included in gas turbine engines presents challenges based the mechanical characteristics of the various materials used (strength, coefficients of thermal expansion, etc.).

SUMMARY

The present disclosure may comprise one or more of the following features and combinations thereof.

According to the present disclosure a turbine vane comprises an end wall, an airfoil, and an attachment unit. In illustrative embodiments. The end wall comprises metallic materials and is adapted to bound a primary gas path. The airfoil comprises ceramic matrix composite materials and is aerodynamically shaped to redirect gasses that move along the primary gas path. The airfoil is formed to include an external surface exposed to the primary gas path and an internal surface, opposite the external surface, that is shielded from the primary gas path.

In illustrative embodiments, the attachment unit is configured to couple the airfoil to the end wall. In illustrative embodiments, the attachment unit is shaped to include an airfoil-receiving channel that receives the airfoil and such that the attachment unit engages the external and internal surfaces of the airfoil with a friction fit so that the attachment unit is coupled via friction with the airfoil.

In illustrative embodiments, the attachment unit includes an outer collar engaged with the exterior surface of the airfoil and an inner collar engaged with an interior surface of the airfoil. In illustrative embodiments, the outer collar includes a band that engages a portion of the exterior surface of the airfoil and a lip that engages along a radial end of the airfoil to radially locate the outer collar relative to the airfoil.

In illustrative embodiments, the band and the lip of the outer collar form surfaces defining the airfoil receiving channel. In illustrative embodiments, the outer collar is coupled to the inner collar by a bond formed between the lip of the outer collar and the inner collar, and the bond is one of a diffusion weld bond, and a braze bond.

In illustrative embodiments, the inner collar includes a band that extends along a portion of the interior surface of the airfoil and a lip that engages the radial end of the airfoil to radially locate the inner collar relative to the airfoil. In illustrative embodiments, the outer collar is coupled to the inner collar by a bond formed between the lip of the outer collar and the lip of the inner collar. In illustrative embodiments, the bond is one of a diffusion weld bond, and a braze bond.

In illustrative embodiments, the attachment unit comprises metallic materials and is couple to the end wall by a mechanical bi-cast joint. In illustrative embodiments, wherein the outer collar of the first attachment unit is integrally formed with the first end wall. In illustrative embodiments, the airfoil is hollow such that a passageway extends from an outer radial end to an inner radial end of the airfoil.

According to another aspect of the present disclosure includes a turbine vane comprising a first end wall, an airfoil, and a first attachment unit. In illustrative embodiments. The first end wall comprises metallic materials and is adapted to bound a primary gas path. In illustrative embodiments, the airfoil comprises ceramic matrix composite materials and is aerodynamically shaped to redirect gasses that move along the primary gas path. In illustrative embodiments. The airfoil is formed to include an external surface exposed to the primary gas path and an internal surface, opposite the external surface, that is shielded from the primary gas path.

In illustrative embodiments, the first attachment unit is configured to couple the airfoil to the first end wall. In illustrative embodiments, the first attachment unit includes an outer collar comprising metallic materials and an inner collar comprising metallic materials. In illustrative embodiments, the outer collar is engaged with the exterior surface of the airfoil and the inner collar engaged with an interior surface of the airfoil such that a friction fit is established between the first attachment unit and the airfoil.

In illustrative embodiments, the outer collar of the first attachment unit is bonded to the first end wall by a braze bond. In illustrative embodiments, the outer collar of the first attachment unit includes a gas path facing surface that is flush with a gas path facing surface of the first end wall. In illustrative embodiments, the attachment unit comprises metallic materials and is couple to the end wall by a mechanical bi-cast joint.

In illustrative embodiments, the outer collar of the first attachment unit includes a gas path facing surface that is flush with a gas path facing surface of the first end wall. In illustrative embodiments, the outer collar of the first attachment unit is integrally formed with the first end wall.

In illustrative embodiments, the inner collar of the first attachment unit includes a band that extends along a portion of the interior surface of the airfoil and a lip that engages a radial end of the airfoil to radially locate the inner collar relative to the airfoil. In illustrative embodiments, the outer collar of the first attachment unit includes a band that engages a portion of the exterior surface of the airfoil and a lip that engages the radial end of the airfoil to radially locate the outer collar relative to the airfoil. In illustrative embodiments, the outer collar is coupled to the inner collar by a bond formed between the lip of the outer collar and the lip of the inner collar.

In illustrative embodiments, the turbine vane further comprises a second end wall comprising metallic materials and adapted to bound the primary gas path, and a second attachment unit configured to couple the airfoil to the second end wall. In illustrative embodiments, the second attachment unit includes an outer collar comprising metallic materials and an inner collar comprising metallic materials. In illustrative embodiments, the outer collar is engaged with the exterior surface of the airfoil and the inner collar engaged with an interior surface of the airfoil such that a friction fit is established between the second attachment unit and the airfoil.

In illustrative embodiments, the inner collar of each attachment unit includes a band that extends a portion of the interior surface of the airfoil and a lip that engages a radial end of the airfoil to radially locate the inner collar relative to the airfoil. In illustrative embodiments, the outer collar of each attachment unit includes a band that engages a portion of the exterior surface of the airfoil and a lip that engages the radial end of the airfoil to radially locate the outer collar relative to the airfoil.

According to another aspect of the present disclosure, a method of assembling a turbine vane is taught. The method comprises slipping an inner collar comprising metallic materials into a radial end of an airfoil comprising ceramic matrix composite materials so that a band of the inner collar engages an interior surface of the airfoil and a lip of the inner collar engages a radial end of the airfoil to radially locate the inner collar relative to the airfoil.

In illustrative embodiments, the method comprises slipping an outer collar comprising metallic materials onto the radial end of the airfoil so that a band of the outer collar engages an exterior surface of the airfoil and a lip of the outer collar engages the radial end of the airfoil to radially locate the outer collar relative to the airfoil. In illustrative embodiments, the method comprises diffusion bonding the inner collar to the outer collar along a gap formed between the lip of the inner collar and the lip of the outer collar while the inner collar and the outer collar are positioned to create a friction fit with the airfoil so that an attachment unit including the inner collar, the outer collar. In illustrative embodiments, the diffusion bond is established for interfacing the ceramic matrix composite materials of the airfoil with other metallic components.

In illustrative embodiments, the method further comprises brazing the outer collar to a metallic end wall shaped to define a primary gas path of the turbine vane so as to couple the ceramic matrix composite airfoil to the metallic end wall. In illustrative embodiments, the method further comprises bi-casting the outer collar to a metallic end wall by shaped to define a primary gas path of the turbine vane so as to couple the ceramic matrix composite airfoil to the metallic end wall.

These and other features of the present disclosure will become more apparent from the following description of the illustrative embodiments.

DETAILED DESCRIPTION OF THE DRAWINGS

Figure 1:
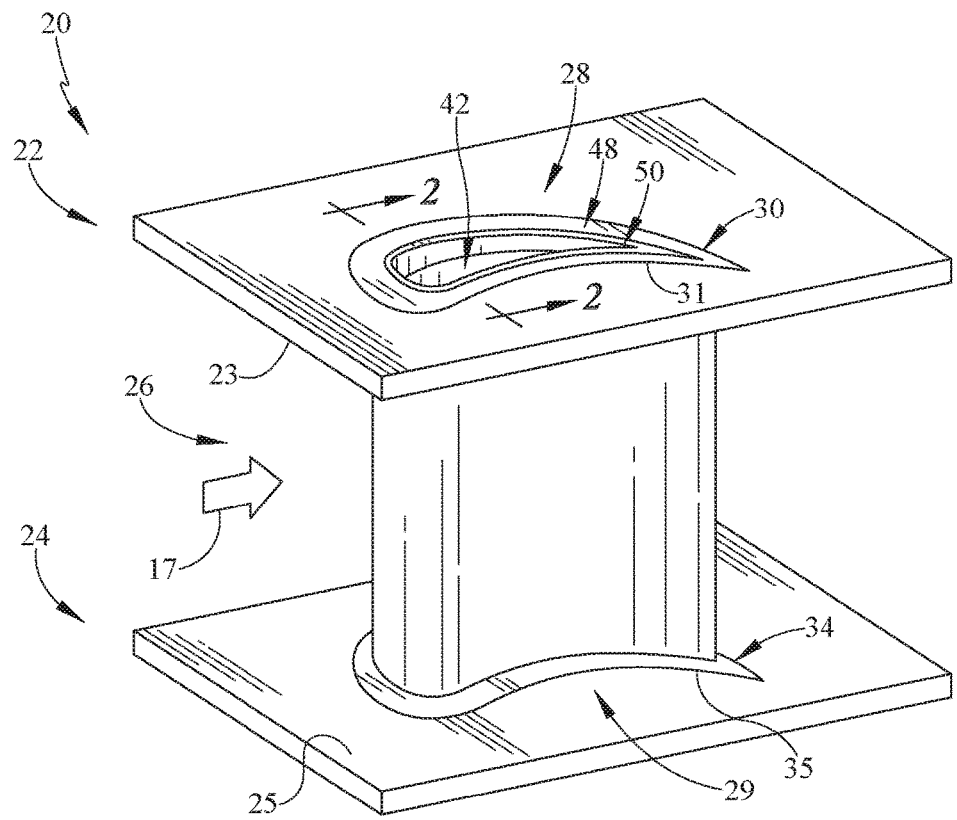
FIG. 1 is a perspective view of a turbine vane adapted for use in a gas turbine engine, the turbine vane including metallic end walls that define a primary gas path across the vane, a ceramic matrix composite airfoil that extends between the end walls to redirect hot gasses moving along the primary gas path, and attachment units configured to couple the ceramic matrix composite airfoil to the metallic end walls.

For the purposes of promoting an understanding of the principles of the disclosure, reference will now be made to a number of illustrative embodiments illustrated in the drawings and specific language will be used to describe the same.

An illustrative turbine vane assembly 20 adapted for use in a gas turbine engine in shown in FIG. 1. Turbine vane 20 is a static component that redirects gas moving through the gas turbine engine so that flow of the gas is smooth and properly oriented for interaction with turbine blades aft of the turbine vane 20. Turbine vane 20 is illustratively shown as a singlet, having only a single airfoil 18; however, it is within the scope of this disclosure for the present teachings to apply to doublets, triplets, etc. having multiple airfoils in a single assembly.

Vane assembly 20 illustratively includes an outer end wall 22, an inner end wall 24, a ceramic matrix composite airfoil 26, and an attachment units 28, 29 as shown in FIG. 1. Outer end wall 22 and inner end wall 24 are metallic structures and form outer and inner boundaries for primary gas path 17. Ceramic matrix composite airfoil 26 extends between and interconnects outer end wall 22 and inner end wall 24 and is shaped to interact with hot gases flowing within primary gas path 17. Attachment units 28, 29 are constructed of metallic materials and are configured to couple ceramic matrix composite airfoil 26 to both outer end wall 22 and inner end wall 24 so that ceramic matrix composite airfoil 26 is secured within a gas turbine engine.

Outer end wall 22 includes a gas path facing surface 23 and is formed to include a first airfoil-receiving aperture 30 as shown in FIG. 1. Gas path surface 23 forms the outer boundary for primary gas path 17. First airfoil-receiving aperture 30 has a first perimeter edge 31 and is shaped to receive both a radially outer end 32 of ceramic matrix composite airfoil 26 and an outer attachment unit 28. Outer end wall 22 is bonded to outer attachment unit 28 around first perimeter edge 31 to secure radially outer end 32 of airfoil 26 to outer end wall 22 and support ceramic matrix composite airfoil 26 in a gas turbine engine.

Inner end wall 24 includes a gas path facing surface 25 and is formed to include a second airfoil-receiving aperture 34 as shown in FIG. 1. Gas path surface 25 forms the inner boundary for primary gas path 17. Second airfoil-receiving aperture 34 has a second perimeter edge 35 and is shaped to receive both a radially inner end 36 of ceramic matrix composite airfoil 26 and an inner attachment unit 29. Inner end wall 24 is bonded to inner attachment unit 29 around second perimeter edge 35 to secure radially inner end 36 of airfoil 26 to inner end wall 24 and support ceramic matrix composite airfoil 26 in a gas turbine engine.

Figure 3:
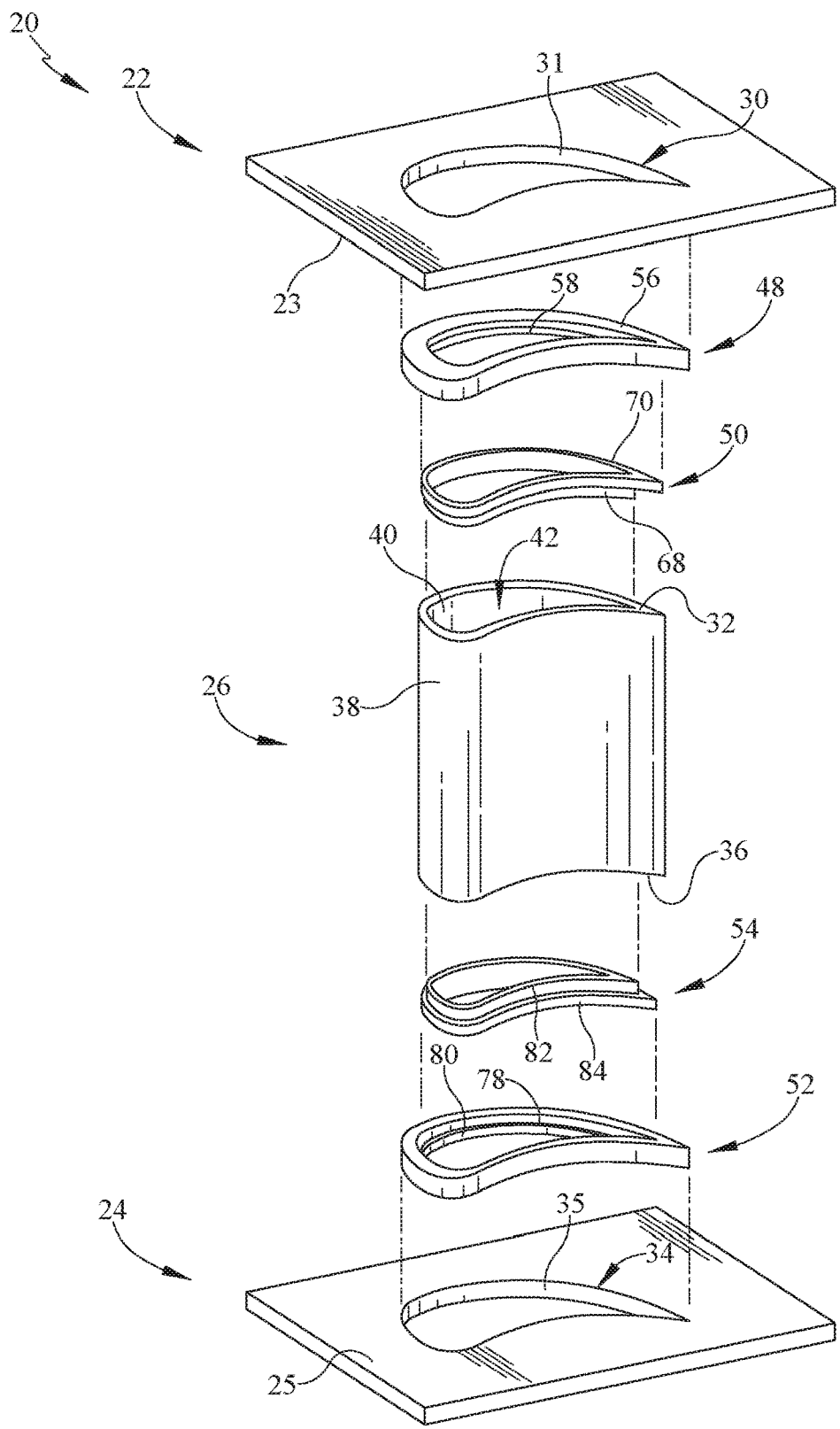
FIG. 3 is an exploded perspective assembly view of the turbine vane of FIGS. 1 and 2 showing the inner and outer collars of the attachment unit independent of one another and the other components of the turbine vane.

Illustratively, first airfoil-receiving aperture 30 and second airfoil-receiving aperture 34 are each shaped like an airfoil as shown in FIGS. 1 and 3. In other embodiments, first airfoil-receiving aperture 30 and second airfoil-receiving aperture 34 may include other suitable shapes such as rectangles, squares, or circles to accommodate the shape of attachment units 28, 29.

Ceramic matrix composite airfoil 26 is shaped to interact with hot gases within primary gas path 17 by guiding the hot gases toward turbine blades within a gas turbine engine. Airfoil 26 includes an external surface 38 and an internal surface 40 as shown in FIG. 1. External surface 38 is exposed to the hot gases flowing within primary gas path 17. Internal surface 40 is opposite external surface 38 and forms a secondary cooling air passageway 42 that extends through ceramic matrix composite airfoil 26 from outer end wall 22 to inner end wall 24. Secondary cooling air passageway 42 is configured to provide cooling air to ceramic matrix composite airfoil 26 from a cooling air source to cool ceramic matrix composite airfoil 26 during operation of gas turbine engine 10.

Figure 2:
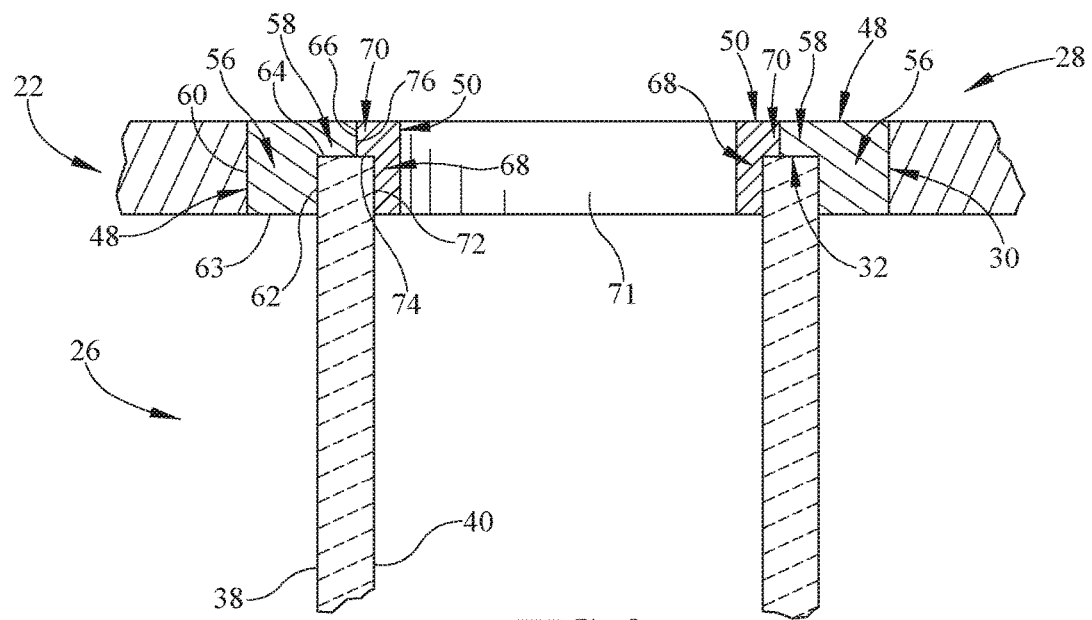
FIG. 2 is a cross-sectional view of a portion of the turbine vane of FIG. 1 taken along line 2-2 showing that an outer attachment unit included in the turbine vane includes in inner collar and an outer collar that are bonded to one another to create a friction fit with the ceramic matrix composite airfoil and showing that the attachment unit is further bonded to an outer end wall of the turbine vane.

Outer attachment unit 28 is adapted to engage radially outer end 32 of airfoil 26 and to be bonded with outer end wall 22 along first airfoil-receiving aperture 30. Outer attachment unit 28 includes an outer collar 48 and an inner collar 50 as shown in FIGS. 1 and 2. Outer collar 48 is sized and shaped to fit within first airfoil-receiving aperture 30 of outer end wall 22. Outer collar 48 engages first perimeter edge 31 of outer end wall 22. Outer collar 48 also engages external surface 38 of airfoil 26.

Inner collar 50 is sized and shaped to fit, at least in part, within secondary cooling air passageway 42 of airfoil 26 and to engage internal surface 40 of airfoil 26 and at least a portion of outer collar 48. Outer collar 48 and inner collar 50 are bonded together and receive radially outer end 32 of airfoil 26 to secure ceramic matrix composite airfoil 26 to outer end wall 22 with a friction fit.

Inner attachment unit 29 is adapted to engage radially inner end 36 of airfoil 26 and to be bonded with outer end wall 22 along second airfoil-receiving aperture 34. Inner attachment unit 29 includes a second outer collar 52 and a second inner collar 54 as shown in FIG. 3. Outer collar 52 is sized and shaped to fit within second airfoil-receiving aperture 34 of inner end wall 24. Outer collar 52 engages second perimeter edge 35 of inner end wall 24. Outer collar 52 also engages external surface 38 of airfoil 26.

Inner collar 54 is sized and shaped to fit, at least in part, within secondary cooling air passageway 42 of airfoil 26 and to engage internal surface 40 of airfoil 26 and at least a portion of outer collar 52. Outer collar 52 and inner collar 54 are configured to bond together and to receive radially inner end 36 of ceramic matrix composite airfoil 26 to secure ceramic matrix composite airfoil 26 to inner end wall 24 with a friction fit.

The assembly of inner attachment unit 29 is identical to the assembly of outer attachment unit 28 shown in FIG. 2, except inner attachment unit 29 is a mirrored assembly to that shown in FIG. 2. As such, the description of outer attachment unit 28 is incorporated herein by reference for inner attachment unit 29.

Outer collar 48 of attachment unit 28 is bonded to outer end wall 22 along airfoil-receiving aperture 30 and engages airfoil 26. Outer collar 48 is a metallic component and includes a band 56 and a lip 58 as shown in FIG. 2. Band 56 is configured to bond to outer end wall 22. Lip 58 is configured to radially locate airfoil 26.

Band 56 includes an exterior surface 60, an interior surface 62, and a gas path surface 63 as shown in FIG. 2. Exterior surface 60 is bonded to perimeter edge 31 to secure outer collar 48 to outer end wall 22. Interior surface 62 is bonded to lip 58 and is arranged to engage external surface 38 of airfoil 26. Gas path surface 63 is flush with gas path surface 23 of outer end wall 22.

Lip 58 of outer collar 48 extends circumferentially away from band 56 into airfoil-receiving aperture 30. Lip 58 has an airfoil-receiving surface 64 and a bonding surface 66. Radially outer end 32 of airfoil 26 engages airfoil-receiving surface 64 to radially locate radially outer end 32 of airfoil 26 within a gas turbine engine. Bonding surface 66 is arranged to bond with inner collar 50.

Inner collar 50 of attachment unit 28 is bonded to outer collar 48 along bonding surface 66 and engages airfoil 26 to secure airfoil 26 within a gas turbine engine. Inner collar 50 is a metallic component and includes a band 68 and a lip 70 as shown in FIG. 2.

Band 68 includes an interior surface 71 and an exterior surface 72 as shown in FIG. 2. Interior surface 71 faces secondary cooling air passageway 42. Exterior surface 72 is arranged to engage internal surface 40 of airfoil 26.

Lip 70 of inner collar 50 extends circumferentially away from band 68 toward outer collar 48. Lip 70 has an airfoil-receiving surface 74 and a bonding surface 76. Radially outer end 32 of airfoil 26 engages airfoil-receiving surface 74 to radially locate radially outer end 32 of airfoil 26 within a gas turbine engine. Bonding surface 76 of inner collar 50 bonds with bonding surface 66 of outer collar 48. The bonding of outer collar 48 and inner collar 50 provides a friction fit or an interference fit for airfoil 26. The friction fit or interference fit secures airfoil 26 to outer end wall 22 and radially locates radially outer end 32 of airfoil 26 within a gas turbine engine.

Outer collar 48 and inner collar 50 are bonded together by one of a a diffusion weld bond, a braze bond, or any other suitable bonding method. Outer collar 48 is attached to outer end wall 22 by one of a bi-cast bond, a mechanical bi-cast join, a diffusion weld bond, a braze bond, or any other suitable bonding method. The same methods are also used to bond the outer and inner collars of attachment unit 29 and to attach attachment 29 to inner end wall 24.

Outer collar 52 of attachment unit 29 is bonded to inner end wall 24 along airfoil-receiving aperture 34 and engages airfoil 26 as suggested in FIG. 3. Outer collar 52 is a metallic component and includes a band 78 and a lip 80. Band 78 is configured to bond to inner end wall 24. Lip 80 is configured to radially locate airfoil 26 relative to inner end wall 24.

Band 78 is bonded to perimeter edge 35 to secure outer collar 52 to inner end wall 24. Band 78 is also bonded to lip 80 and is arranged to engage external surface 38 of airfoil 26. At least a portion of band 78 is flush with gas path surface 25 of inner end wall 24.

Lip 80 of outer collar 52 extends circumferentially away from band 78 into airfoil-receiving aperture 34. Radially inner end 36 of airfoil 26 engages lip 80 to radially locate radially inner end 36 of airfoil 26 within a gas turbine engine.

Inner collar 54 of attachment unit 29 is bonded to outer collar 52 along lip 80 and engages airfoil 26 to secure airfoil 26 within a gas turbine engine. Inner collar 54 is a metallic component and includes a band 82 and a lip 84 as shown in FIG. 3. At least a portion of band 82 of inner collar 54 is received within secondary cooling air passageway 42 of airfoil 26 and engages internal surface 40 of airfoil 26. Lip 84 of inner collar 54 extends circumferentially away from band 82 toward outer collar 52.

Radially outer end 32 of airfoil 26 engages lips 80,84 to radially locate radially outer end 32 of airfoil 26 relative to inner end wall 24 within a gas turbine engine. Lip 80 of outer collar 52 bonds to lip 84 of inner collar 54. The bonding of outer collar 52 and inner collar 54 provides a friction fit or an interference fit for radially inner end 36 of airfoil 26. The friction fit or interference fit secures airfoil 26 to inner end wall 24 and radially locates radially inner end 36 of airfoil 26 relative to inner end wall 24 within a gas turbine engine.

Outer collar 52 and inner collar 54 are bonded together by one of a a diffusion weld bond, a braze bond, or any other suitable bonding method. Similarly, outer collar 52 is attached to inner end wall 24 by one of a bi-cast bond, a diffusion weld bond, a braze bond, or any other suitable bonding method.

During assembly of turbine vane 20, inner collar 50 is slipped onto radially outer end 30 of airfoil 26. In doing so, at least a portion of band 68 is received within secondary cooling air passageway 42 and engages internal surface 40 of airfoil 26. Additionally, lip 70 engages radially outer end 30 of airfoil 26 to radially locate inner collar 50 relative to airfoil 26.

Outer collar 48 is slipped onto radially outer end 30 of airfoil 26. At least a portion of band 56 engages external surface 38 of airfoil 26. Lip 58 engages radially outer end 30 of airfoil 26. Lips 58, 70 are then bonded to establish a diffusion bond so that a friction fit is created between the outer and inner collars 48, 50 and the airfoil 26. As such, lips 58, 70 radially locate airfoil 26 relative to outer end wall 22.

The same process is used for outer collar 52, inner collar 54 and inner end plate 24. Outer collar 52 and inner collar 54 slide onto radially inner end 36 of airfoil 26. Lips 80, 84 are then bonded to establish a diffusion bond so that a friction fit is created between the outer and inner collars 52, 54 and the airfoil 26.

In illustrative embodiments, outer collar 48 is integrally formed with outer end wall 22. In illustrative embodiments, outer collar 52 is integrally formed with inner end wall 24. In illustrative embodiments, the lips of the inner collars may bond directly to the end walls.

In illustrative embodiments, the inner collar would be designed to slip down into the airfoil and have a lip that would seat on top of the airfoil. In illustrative embodiments, the outer collar would slip over the outer surface of the airfoil and also have a lip that would be close tolerance to match with the lip on the inner collar and a slight gap may be present between the two collars. In illustrative embodiments, the inner and outer collar may then be diffusion bonded together thus closing the gap and "pinching" the airfoil between the two. In illustrative embodiments, once this metallic collar is in place, a bi-cast groove could then be machined on the outside of the outer collar and the assembly bi-cast into an end wall. In illustrative embodiments, features used to attach the vane to the static structure would be included in the metallic elements.

Turbine vanes in accordance with the present disclosure can be used to provide a multi-airfoil vane segment fabricated utilizing the CMC in the hottest portion of the flowpath and the metallic elements at the extremities of the flowpath where the gasses are, at least slightly, cooler. In illustrative embodiments, an application for this may be a location where a fully metallic vane needs to have the airfoil cooled but the endwall could be uncooled. In illustrative embodiments, neither the CMC nor the metallic elements need to be cooled but could be as needed. In illustrative embodiments, it can also be envisioned that replacing a metallic vane where the airfoil requires cooling with a CMC that requires considerably less or no cooling may be beneficial.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane comprising:
    an end wall comprising metallic materials and adapted to bound a primary gas path,
    an airfoil comprising ceramic matrix composite materials and aerodynamically shaped to redirect gasses that move along the primary gas path, the airfoil formed to include an external surface exposed to the primary gas path and an internal surface, opposite the external surface, that is shielded from the primary gas path, and
    an attachment unit configured to couple the airfoil to the end wall, the attachment unit shaped to include an airfoil-receiving channel that receives the airfoil and such that the attachment unit engages the external and internal surfaces of the airfoil with a friction fit so that the attachment unit is coupled via friction with the airfoil.

2. The turbine vane of claim 1, wherein the attachment unit includes an outer collar engaged with the exterior surface of the airfoil and an inner collar engaged with an interior surface of the airfoil.

3. The turbine vane of claim 2, wherein the outer collar includes a band that engages a portion of the exterior surface of the airfoil and a lip that engages along a radial end of the airfoil to radially locate the outer collar relative to the airfoil.

4. The turbine vane of claim 3, wherein the band and the lip of the outer collar form surfaces defining the airfoil receiving channel, wherein the outer collar is coupled to the inner collar by a bond formed between the lip of the outer collar and the inner collar, and wherein the bond is one of a diffusion weld bond and a braze bond.

5. The turbine vane of claim 3, wherein the inner collar includes a band that extends along a portion of the interior surface of the airfoil and a lip that engages the radial end of the airfoil to radially locate the inner collar relative to the airfoil.

6. The turbine vane of claim 5, wherein the outer collar is coupled to the inner collar by a bond formed between the lip of the outer collar and the lip of the inner collar.

7. The turbine vane of claim 6, wherein the bond is one of a diffusion weld bond and a braze bond.

8. The turbine vane of claim 1, wherein the attachment unit comprises metallic materials and is coupled to the end wall by a braze bond.

9. The turbine vane of claim 1, wherein the attachment unit comprises metallic materials and is couple to the end wall by a mechanical bi-cast joint.

10. The turbine vane of claim 1, wherein the outer collar of the first attachment unit is integrally formed with the first end wall.

11. The turbine vane of claim 1, wherein the airfoil is hollow such that a passageway extends from an outer radial end to an inner radial end of the airfoil.

12. A turbine vane comprising:
    a first end wall comprising metallic materials and adapted to bound a primary gas path,
    an airfoil comprising ceramic matrix composite materials and aerodynamically shaped to redirect gasses that move along the primary gas path, the airfoil formed to include an external surface exposed to the primary gas path and an internal surface, opposite the external surface, that is shielded from the primary gas path, and a first attachment unit configured to couple the airfoil to the first end wall, the first attachment unit including an outer collar comprising metallic materials and an inner collar comprising metallic materials, wherein the outer collar is engaged with the exterior surface of the airfoil and the inner collar engaged with an interior surface of the airfoil such that a friction fit is established between the first attachment unit and the airfoil.

13. The turbine vane of claim 12, wherein the outer collar of the first attachment unit is bonded to the first end wall by a braze bond.

14. The turbine vane of claim 13, wherein the outer collar of the first attachment unit includes a gas path facing surface that is flush with a gas path facing surface of the first end wall.

15. The turbine vane of claim 12, wherein the attachment unit comprises metallic materials and is coupled to the end wall by a mechanical bi-cast joint.

16. The turbine vane of claim 15, wherein the outer collar of the first attachment unit includes a gas path facing surface that is flush with a gas path facing surface of the first end wall.

17. The turbine vane of claim 12, wherein the outer collar of the first attachment unit is integrally formed with the first end wall.

18. The turbine vane of claim 12, wherein the inner collar of the first attachment unit includes a band that extends along a portion of the interior surface of the airfoil and a lip that engages a radial end of the airfoil to radially locate the inner collar relative to the airfoil.

19. The turbine shroud of claim 18, wherein the outer collar of the first attachment unit includes a band that engages a portion of the exterior surface of the airfoil and a lip that engages the radial end of the airfoil to radially locate the outer collar relative to the airfoil.

20. The turbine vane of claim 19, wherein the outer collar is coupled to the inner collar by a bond formed between the lip of the outer collar and the lip of the inner collar.

21. The turbine vane of claim 12, further comprising a second end wall comprising metallic materials and adapted to bound the primary gas path, and a second attachment unit configured to couple the airfoil to the second end wall, the second attachment unit including an outer collar comprising metallic materials and an inner collar comprising metallic materials, wherein the outer collar is engaged with the exterior surface of the airfoil and the inner collar engaged with an interior surface of the airfoil such that a friction fit is established between the second attachment unit and the airfoil.

22. The turbine vane of claim 21, wherein the inner collar of each attachment unit includes a band that extends a portion of the interior surface of the airfoil and a lip that engages a radial end of the airfoil to radially locate the inner collar relative to the airfoil, and wherein the outer collar of each attachment unit includes a band that engages a portion of the exterior surface of the airfoil and a lip that engages the radial end of the airfoil to radially locate the outer collar relative to the airfoil.

23. A method of assembling a turbine vane, the method comprising:
   slipping an inner collar comprising metallic materials into a radial end of an airfoil comprising ceramic matrix composite materials so that a band of the inner collar engages an interior surface of the airfoil and a lip of the inner collar engages a radial end of the airfoil to radially locate the inner collar relative to the airfoil,
   slipping an outer collar comprising metallic materials onto the radial end of the airfoil so that a band of the outer collar engages an exterior surface of the airfoil and a lip of the outer collar engages the radial end of the airfoil to radially locate the outer collar relative to the airfoil, and
   diffusion bonding the inner collar to the outer collar along a gap formed between the lip of the inner collar and the lip of the outer collar while the inner collar and the outer collar are positioned to create a friction fit with the airfoil so that an attachment unit including the inner collar, the outer collar, and the diffusion bond is established for interfacing the ceramic matrix composite materials of the airfoil with other metallic components.

24. The method of claim 23, further comprising brazing the outer collar to a metallic end wall shaped to define a primary gas path of the turbine vane so as to couple the ceramic matrix composite airfoil to the metallic end wall.

25. The method of claim 24, further comprising bi-casting the outer collar to a metallic end wall shaped to define a primary gas path of the turbine vane so as to couple the ceramic matrix composite airfoil to the metallic end wall.

* * * * *